United States Patent [19]

Foley et al.

[11] 3,956,227

[45] May 11, 1976

[54] MOULDING COMPOUNDS

[75] Inventors: Kevin M. Foley, Hebron; Robert L. Muto, Newark; Anil K. Rastogi, Granville, all of Ohio

[73] Assignee: Owens-Corning Fiberglas Corporation, Toledo, Ohio

[22] Filed: Jan. 2, 1975

[21] Appl. No.: 537,870

[52] U.S. Cl. .................................... 260/38; 106/90
[51] Int. Cl.² .......................................... C08K 61/06
[58] Field of Search ............ 106/90; 260/38, 395 B, 260/DIG. 40, 29.3

[56] References Cited
UNITED STATES PATENTS

| | | | |
|---|---|---|---|
| 2,793,130 | 5/1957 | Shannon | 260/39 SB |
| 3,216,966 | 11/1965 | Collins | 260/38 |
| 3,234,159 | 2/1966 | Cooper | 260/38 X |
| 3,240,736 | 3/1966 | Beckwith | 260/29.2 |
| 3,331,885 | 7/1967 | Rider | 260/38 X |
| 3,415,774 | 12/1968 | Hood | 260/38 |
| 3,666,703 | 5/1972 | Murata | 260/DIG. 40 |
| 3,720,642 | 3/1973 | Junger | 260/DIG. 40 |
| 3,734,936 | 5/1973 | Brown | 260/39 SB |
| 3,847,860 | 11/1974 | Seiler | 260/38 |

*Primary Examiner*—Winston A. Douglas
*Assistant Examiner*—John F. Niebling
*Attorney, Agent, or Firm*—John W. Overman; Patrick P. Pacella

[57] ABSTRACT

We have molded articles from molding compounds containing a thermosetting resin, at least one cement, and at least one silane coupling agent. These molding compounds exhibit improved strength properties and can be used to form shingles, appliances such as bathtubs, and coatings.

14 Claims, No Drawings

MOULDING COMPOUNDS

This invention relates to molding compounds containing cements and silane coupling agents.

The production of phenolic molding compounds is an old art, having involved over the years the use of two different types of phenol-formaldehyde condensates: novolacs and resoles. Recent developments include phenolic molding compounds containing cements. In one such development, the molding compounds comprise a mixture of a thermosetting resin and cement. In these systems, the resin is produced prior to admixture with cement. Hereinafter we will refer to these systems as "resin systems." In another development, the cement is mixed with the monomers prior to the production of the resin. Hereinafter, we will refer to these systems as "monomer systems." Both of these systems have excellent fire resistance and low smoke producing properties. And they have physical properties comparable to conventional phenolic molding compounds.

We have now improved the strength properties of these molding systems. We do this by adding to the molding compounds coupling agents of at lest one of (a) an organo silane containng at least two hydrolyzable silane groups wherein the distance between any two hydrolysis cites on a glass fiber is greater than the distance between any two hydrolyzable silane groups in the organo silane, or (b) an aminoalkylsilane. The molding compounds can be used to form shingles, appliances such as bathtubs, and coatings.

The molding compounds of this invention contain 0.01 to 10.0 weight percent of the coupling agents based on the total weight of the molding compounds. Preferably this amount ranges from 0.01 to 5.0 weight percent.

The term cement includes magnesium oxychloride cements, magnesium oxysulfate cements, gypsum products, and a wide variety of hydraulic cements. Briefly, hydraulic cements are those inorganic cements which set and harden by the addition of water. Specific examples of hydraulic cements include aluminous cements, masonry cements, natural cements, portland cements, portland blast furnace slag cement, portland-pozzolan cement, and slag cement. Preferably, portland cement is used alone or in conjunction with other cements.

The weight ratio of the cement to the thermosetting resin is dependent upon the total amount of water of condensation and water charged to the mix.

In both the resin systems and the monomer systems, the amount of cement added to the resin is within the range of from about 1 to about 9 parts by weight of cement per part by weight of total water.

In the monomer system it was found that the amount of cement added to the resin is within the range of from about 1 to 9 times the weight of the sum of the weight of the water charged to the condensation reaction and three-fifths of the weight of the formaldehyde so charged.

In the resin system the water content of the thermosetting resin is determined and cement is added in an amount within the range of from about 1 to about 9 parts by weight of cement per part by weight of water in the thermosetting resin.

In the production of the thermosetting resin component, suitable phenol derivatives include all aliphatic phenol derivatives of the general formula:

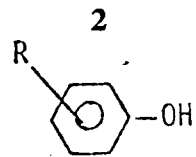

wherein R is positioned in the ortho, meta, or para position relative to the hydroxyl radical and is hydrogen or an alkyl radical containing from one to 15 carbon atoms. A particularly suitable aliphatic phenol derivative is nonyl phenol.

As a substitute for the phenol derivative in the thermosettin resin, any suitable polyhydroxy aromatic compound can be employed. A particularly suitable polyhydroxy aromatic compound is resorcinol.

In the thermosetting resin component, suitable aldehydes include all aliphatic aldehyde derivatives of the general formula:

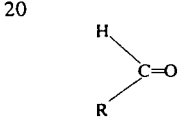

wherein R is hydrogen or an alkyl radical containing from 1 to 5 carbon atoms. A particularly suitable aliphatic aldehyde is formaldehyde.

In the production of the thermosetting resin component, any suitable amino compound can be employed. Particularly suitable amino compounds are urea and melamine.

Employable in this invention as the thermosetting resin component will be phenol-formaldehyde condensates, phenol-aminoplast-formaldehyde condensates, aminoplast-formaldehyde condensates, resorcinol-formaldehyde condensates, and resorcinol-formaldehyde-urea condensates.

With regard to the coupling agents, a particularly suitable aminoalkylsilane is gamma-aminopropyltriethoxysilane which is commercially available from Union Carbide under the product designation "A-1100" and from General Electric under the product designation "SC-3900." Also suitable is N-beta (aminoethyl) gamma-aminopropyltri-methoxysilane commercially available from Union Carbide under the product designation "A-1120" and from Dow Corning under the product designation "Z-6020."

The organo silane containing at least two hydrolyzable silane groups having the formula:

$(RO)_3SiR'Si(OR)_3$ wherein each R is an alkyl or aryl group containing from one to ten carbons and R' is an alkylene or phenylene group containing from one to fifteen carbons. A particularly suitable second silane coupling agent is bis (B-trimethoxysilylethyl) benzene

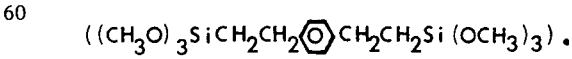

The molding compounds of this invention can be molded by any suitable molding method. They are particularly suitble for use as sheet molding compounds (SMC). When so used, the molding compound is employed in an amount from about 10 to about 95 percent by weight of the total composition, reinforcing glass fibers in an amount up to about 80 percent by weight of the total composition, and fillers in an amount to make up the balance of the total composition.

Preferred fillers are calcium carbonate and alumina.

The following examples further illustrate our invention.

EXAMPLE I

This example demonstrates the monomer system in which we employed a combination of cements. The following ingredients were employed.

| Ingredients | Weight, grams | Mole Ratio |
|---|---|---|
| Phenol | 94 | 1 |
| 52% Formaldehyde Solution in Water | 144.2 | 2.5 |
| Portland Cement | 171.3 | |
| Gypsum Cement | 171.3 | |
| Deionized Water | 45 | |

The ingredients can be mixed in any order and by any suitable mixing procedure. However, it is preferred to add the cements in two steps to enable the resulting exothermic reaction to be controlled thus avoiding immediate set-up of the cements.

In this example, 94 grams of phenol, 144.2 grams of a 52% solution of formaldehyde in water, 45 grams of water, and 10 grams of portland cement were added to a beaker at room temperature. The mixture was stirred and the exothermic reaction proceeded immediately.

The beaker was water-cooled to prevent heating to a temperature over 60°C. The mixture was permitted to cool to room temerature at which time the remaining 161.3 grams of portland cement and 171.3 grams of gypsum cement were added to the beaker with stirring. The resulting product was recovered as a molding compound. The gypsum cement used was Hydracal B-11 commercially available from United States Gypsum.

EXAMPLE II 8.7 grams of gamma-aminopropyltriethoxysilane were added to 580.8 grams of the monomer system of Example I. The addition was made at room temperature in a beaker with stirring. The resulting product was recovered as a molding compound. The gamma-aminopropyltriethoxysilane was "A-1100" available from Union Carbide.

EXAMPLE III 8.7 grams of bis (B-trimethoxysilylethyl) benzene, a silane coupling agent with two hydrolyzable silane groups, were added to 580.8 grams of the monomer system of Example I. The addition was made at room temperature in a beaker with stirring. The resulting product was recovered as a molding compound.

EXAMPLE IV 4.35 grams of gamma-aminopropyltriethoxysilane and 4.35 grams of bis (B-trimethoxysilylethyl) benzene, a silane coupling agent with two hydrolyzable silane groups, were added to 580.8 grams of the monomer system of Example I. The addition was made at room temperature in a beaker with stirring. The resulting product was recovered as a molding compound.

The gamma-aminopropyltriethoxysilane was "A-1100" available from Union Carbide.

EXAMPLE V

This example demonstrates the method of producing a thermosetting resin suitable for use in the resin system of producing molding comounds.

The resin product was produced as follows:

| Ingredients | Parts by Weight | Mole Ratio |
|---|---|---|
| Phenol | 67.10 | 1 |
| 52% Formaldehyde Solution in Water | 127.90 | 3.1 |
| Calcium Oxide | 3.78 | |
| Dicyandiamide | 3.35 | |
| Urea (liquid) | 20.06 | |

The phenol and formaldehyde were charged to a rector, blended and heated to a temperature of 110°F. The calcium oxide catalyst then was added over a 2 hour period while maintaining the temperature at 110°F. The temperature of the reactants was increased to 125°F over a 30 minute period and then maintained at that temperature for an additional 90 minutes. The temperature then was raised to 140°F during a period of 30 minutes and maintained at that temperaure until the free formaldehyde content ranges from 7.0 to 7.2 percent by weight. The dicyandiamide was added over a 30 minute period at 140°F and the reaction was cooled to 105°F over the next ½ hour period. The urea was added at 105°F and neutralization followed when the temperature dropped below 100°F by addition of a mixture of 20 percent by weight of phosphoric acid and 80 percent by weight of sulfuric acid to a pH ranging from 7.2 to 7.3

The resulting resin had a stroke cure of 77 seconds and a free phenol content of 1.2 percent.

EXAMPLE VI 5000 grams of the resin of Example V, 2500 grams of portland cement, and 2500 grams of gypsum cement were added to a stainless steel vessel at room temperature with stirring. The resulting product was recovered as a molding compound.

EXAMPLE VII 5.25 grams of gamma-aminopropyltriethoxysilane were added to 350 grams of the resin system of Example VI. The addition was made at room temperature in a beaker with stirring. The resulting product was recovered as a molding compound. The gamma-aminopropyltriethoxysilane was "A-1100" available from Union Carbide.

EXAMPLE VIII 5.25 grams of bis (B-trimethoxysilylethyl) benzene, a silane coupling agent with two hydrolyzable silane groups, were added to 350 grams of the resin system of Example VI. The addition was made at room temperature in a beaker with stirring. The resulting product was recovered as a molding compound.

EXAMPLE IX 2.62 grams of gramma-aminopropyltriethoxysilane and 2.62 grams of bis (B-trimethoxysilylethyl) benzene were added to 350 grams of the resin system of Example VI. The addition was made at room temperature in a beaker with stirring. The resulting product was recovered as a molding compound.

EXAMPLE X

This example will demonstrate the incorporation of a resin system into sheet molding compound (SMC). The following ingredients were employed.

| Ingredients | Weight, grams |
|---|---|
| Resin of Example VI | 10,000 |
| gamma-aminopropyltriethoxysilane | 10 |
| bis (B-trimethoxysilylethyl) benzene | 10 |
| Alumina | 2,000 |
| Zinc Stearate | 200 |

The above ingredients can be mixed in any order and by any suitable mixing procedure. However, in this example, they were mixed as follows. The resin was first charged to a stainless steel mixing vessel at room temperature. The gamma-aminopropyltriethoxysilane and the bis (B-trimethoxysilylethyl) benzene were added next with stirring. While the stirring was continued and room temperature maintained, the alumina was added followed by the zinc stearate.

The resulting composition was co-deposited with chopped glass fiber strand on a moving polyethylene film approximately 24 inches in width and of indefinite length. A second polyethylene film also 24 inches in width and of indefinite length, was brought into contact with the upper surface of the sheet-like mass of deposited glass fibers and resin-cement mixture and was moved with the mass and the first sheet. Sheets of the mass, approximately 24 inches by 20 inches by ⅛ inch, were cut from the mass, leaving the polyethylene films on each of the two major sides thereof. Moldings were produced from these sheets between matched flat dies, moldings being conducted for 5 minutes at 300°F and 1000 pounds per square inch.

Sheet produced as described above were tested for flexural modulus, for flexural strength, for tensile strength, and for notched Izod impact strength, both (1) as molded, and (2) after the sheets had been autoclaved for 16 hours at a temperature of 227°F. Results of this testing are summarized in the following Table and are compared to a control in which the sheets were produced from a molding compound which employed the same resin system without coupling agent.

TABLE

| | Control | Example X |
|---|---|---|
| Flexural Strength, psi × 10³ (as molded) | 11.99 | 19.43 |
| Flexural Strength, psi × 10³ (after 16 hours of autoclaving) | 7.65 | 10.95 |
| Flexural Modulus, psi × 10⁶ (as molded) | 1.107 | 1.706 |
| Flexural Modulus, psi × 10⁶ (after 16 hours of autoclaving) | 0.759 | 1.309 |
| Tensile Strength, psi × 10³ (as molded) | 4.37 | 7.75 |
| Tensile Strength, psi × 10³ (after 16 hours of autoclaving) | 2.41 | 4.37 |
| Notched Izod Impact Strength, Foot-Pounds/inch (as molded) | 8.92 | 7.20 |

In the examples, flexural strength and flexural modulus were determined according to ASTM Specification D790, tensile strength was determined according to ASTM Specification D638, and impact strength was determined according to ASTM Specification D256.

These results demonstrate that the molding compounds of this invention possess physical properties which made them very desirable for use as molding compounds. The molded articles were found to be fire resistant, to be low smoke producing, and to have improved strength. In addition, the molded articles were easily cured in a closed mold.

It will be evident from the foregoing that various modifications can be made to this invention. Such, however, are considered as being within the scope of this invention.

We claim:

1. A molding compound consisting essentially of a mixture of
   1. a thermosetting resin of at least one of phenol-formaldehyde condensates, phenol-aminoplast-formaldehyde condensates, aminoplast-formaldehyde condensates, resorcinol-formaldehyde condensates, or resorcinol-formaldehyde-urea condensates;
   2. at least one inorganic cement, wherein said cement is present in an amount within the range of from about 1 to about 9 parts by weight of cement per part by weight of the water content of the thermosetting resin; and
   3. 0.01 to 10.0 weight percent of a coupling agent based on the total weight of the coupling agent wherein the coupling agent is at least one organo silane containing at least two hydrolyzable silane groups wherein the distance between any two hydrolysis cites of a glass fiber is greater than the distance between any two hydrolyzable silane groups in the organo silane and wherein the coupling agent has the general formula $(RO)_3SiR'Si(OR)_3$ wherein each R is an alkyl or aryl group containing from 1 to 10 carbons and R' is an alkylene or phenylene group containing from 1 to 15 carbons.

2. The molding compound of claim 1 wherein said cement comprises a cement selected from the group consisting of magnesium oxychloride cements, magnesium oxysulfate cements, gypsum products, or hydraulic cements.

3. The molding compound of claim 2 wherein said hydraulic cement comprises a cement selected from the group consisting of aluminous cements, masonry cements, natural cements, portland cements, portland blast furnace slag cements, portland-pozzolan cements, or slag cements.

4. The molding compound of claim 2 wherein said cement comprises a mixture of hydraulic cement and gypsum cement.

5. The molding compound of claim 4 wherein said hydraulic cement is portland cement.

6. The molding compound of claim 1 wherein the weight percent of said coupling agent ranges from 0.01 to 5.0%.

7. The molding compound of claim 1 wherein the weight percent of said coupling agent is 0.15%.

8. A molding compound consisting essentially of a mixture of
   1. a condensate resin formed from at least one inorganic cement, formaldehyde, and at least one of phenol, aminoplasts, or resorcinol; wherein the weight of the cement is from one to nine times the sum of the weight of the water used to form the resin and three-fifths of the weight of the formaldehyde used to form the resin; and 2. a coupling agent of at least one organo silane containing at least two hydrolyzable silane groups wherein the distance between any two hydrolysis cites of a glass fiber is greater than the distance between any two hydrolyzable silane groups in the organo silane, wherein the molding compound contains 0.01 to 10.0 weight percent of the coupling agent based on the total weight of the molding compound and wherein the coupling agent has the general formula $$(RO)_3SiR'Si(OR)_3$$

wherein each R is an alkyl or aryl group containing from 1 to 10 carbons and R' is an alkylene or phenylene group containing from 1 to 15 carbons.

9. The molding compound of claim 8 wherein said cement comprises a cement selected from the group consisting of magnesium oxychloride cements, magnesium oxysulfate cements, gypsum products, or hydraulic cements.

10. The molding compound of claim 9 wherein said hydraulic cement comprises a cement selected from the group consisting of aluminous cements, masonry cements, natural cements, portland cements, portland blast furnace slag cements, portland-pozzolan cements, or slag cements.

11. The molding compound of claim 9 wherein said cement comprises a mixture of hydraulic cement and gypsum cement.

12. The molding compound of claim 11 wherein said hydraulic cement is portland cement.

13. The molding compound of claim 8 wherein the weight percent of said coupling agent ranges from 0.01 to 5.0%.

14. The molding compound of claim 8 wherein the weight percent of said coupling agent is 0.15%.

* * * * *